United States Patent Office 2,965,623
Patented Dec. 20, 1960

2,965,623

POLYMERIZATION OF VINYL ESTERS

Harry Wechsler, Leominster, and Stanley S. Levy, Malden, Mass., assignors to The Borden Company, a corporation of New Jersey No Drawing. Filed Nov. 8, 1957, Ser. No. 695,243

2 Claims. (Cl. 260—89.1)

This invention relates to the product and process of polymerizing vinyl esters suspended as the dispersed phase in water.

The invention is particularly useful in making polyvinyl acetate of relatively low molecular weight, without the need of resorting to excessively high temperatures of polymerization or objectionably high concentration of either peroxide catalyst or of chain transfer agent. High proportions of peroxide catalysts lead to increased hazard or unnecessary expense or both. Chain transfer agents, used to limit the molecular weight of the resulting polymer, are of limited effectiveness for this purpose under conditions previously used and, in large proportions, act somewhat as inhibitors of polymerization and decrease the stability of the resulting suspension of polymerized acetate, as by promoting agglomeration of the resulting beads into particles of size to separate from the suspension.

Our invention provides a composition and process that avoids these objections. It makes possible the preparation of polymerized beads of vinyl acetate or like ester with surfaces that resist the agglomeration.

Briefly stated, the invention comprises the polymerization of particles of a vinyl ester dispersed in water under the joint action of a lipophylic initiator of polymerization within the dispersed particles and a hydrophylic initiator, the hydrophylic initiator being considered to be in substantial concentration in the aqueous phase, in contact with the exterior surfaces of the vinyl ester particles, and to cause them to undergo such exterior polymerization and surface hardening that coalescence of the particles by contact of their surfaces is reduced to a permissible level or eliminated entirely. The invention comprises also the use of an alkali in amount to establish the pH of the aqueous phase above 7 at the start of the polymerization, use of an agent such as polyvinyl alcohol for improving the dispersion of the vinyl ester in the aqueous medium, and a chain transfer agent such as an aldehyde for limiting the polymerization to molecular weight and viscosity of the resulting polymerized vinyl ester within the desired ranges.

With compositions of the kind described and with the process of the invention, we have polymerized vinyl acetate in aqueous suspensions to a product that was free from objectionable coalescence during polymerization.

As to materials used, the vinyl ester to be polymerized is ordinarily vinyl acetate. We may use, however, other esters of the $C_2$—$C_{18}$ monocarboxylic aliphatic acids, as for example, vinyl propionate, butyrate or stearate.

As the dispersing or suspending agent we know of no material that is as satisfactory as polyvinyl alcohol.

We use a chain transfer agent that is conventional for this purpose and for best results acetaldehyde, propionaldehyde, or butyraldehyde.

The lipophylic initiator is one that is oil soluble. Its distribution coefficient favors concentration in the vinyl acetate particles rather than the aqueous phase of the suspension. For this purpose we use any of the organic per-compounds conventionally employed for initiating polymerization of vinyl acetate. Examples of such lipophylic per-compounds that we use are ditertiary-butyl, dibenzoyl, and dilauroyl peroxides and the corresponding perbenzoates, perphthalates or peracetates.

As the hydrophylic initiator hydrogen peroxide is both satisfactory and economical, we use it in the form of a commercial aqueous solution, as, for instance, one of about 30% concentration of actual hydrogen peroxide.

The alkali used to establish the pH is one that distributes itself largely in the aqueous phase. Such water soluble alkali is any one of the alkali metal hydroxides or carbonates. There is no advantage in using the bicarbonates. Sodium carbonate is both economical and satisfactory.

The proportions of certain materials will vary with the rate of polymerization or level of viscosity or average molecular weight desired in the finished product. Thus, the proportion of the chain transfer agent and of the two classes of peroxides (including the other organic per-compounds) are selected with these features in mind.

In general, proportions that are suitable for commercial operation and also that are permissible are shown in the following table:

| Component | Parts by weight | |
|---|---|---|
| | Commercial Proportions | Permissible Range |
| Vinyl ester monomer | 100 | 100 |
| Water | 50–200 | 25–1,000 |
| Polyvinyl alcohol, as percent of water | 0.04%–0.1% | 0.04%–5% |
| Lipophylic peroxide | 0.1–1 | 0.02–2 |
| Hydrophylic peroxide (anhydrous basis) | 0.003–0.03 | [1] 0.0003–0.3 |
| Alkali, to establish initial pH | 8.5–10 | [2] above 7 |
| Chain transfer agent | 1–3 | 0.5–8 |

[1] Approximate maximum for safe operation.
[2] When sodium carbonate is the alkali, suitable proportions are 0.01%–0.5% and ordinarily 0.1%–0.3% of the aqueous phase.

The method in general consists in vigorously mixing the materials and warming the mix to a temperature not above boiling under the prevailing pressure until the polymerization is effected. The viscosities will then be approximately within 5–35 cps. (molar solution in benzene), the exact viscosity depending on the polymerization conditions. Ordinarily we reflux the suspension while continuing the rapid agitation until the temperature or refluxing becomes practically constant at about 93° C., a representative period of refluxing being 2–6 hours. We operate for best results at a pH within the range about 8.5–10 at the start and in some cases add sodium carbonate solution, as in 1 or 2 portions during the polymerization and as may be required to maintain the pH within the range 4.5–10 and usually at about 5–5.5. The initial pH is required for stability of the solution. A pH much above 10 leads to an objectionable degree of hydrolysis of the vinyl ester.

As the heating is effected, the monomer, it is considered, passes through the stage at which the surfaces would ordinarily be so soft as to cause agglomeration. The hydrogen peroxide initiator in the external phase, however, so modifies the surface that the coalescence is reduced and there results a stable suspension of polymerized beads with hardened exteriors as well as interiors.

The following table shows the effect of variations in proportions on the properties of the polymerized suspension. It shows particularly the need of not only the organic peroxide normally used but also the hydrogen peroxide and alkali as well as the polyvinyl alcohol, in preventing instability of the finished suspension. In all cases the proportions of vinyl acetate monomer used and water were 100 each and the time of refluxing was the same in each example. The resulting polymerized beads were centrifuged from a portion of the suspension, dried, and tested.

peroxide as an initiator of polymerization within the suspended particles, hydrogen peroxide as a hydrophylic initiator of polymerization of the exterior surfaces of the

| Ex. No | 1 | 2 | 3 | 4 | 5 | 6 | 7 | 8 | 9 | 10 | 11 |
|---|---|---|---|---|---|---|---|---|---|---|---|
| Polyvinyl alcohol | 0.02 | 0.03 | 0.04 | 0.04 | 0.04 | 0.04 | 0.04 | 0.04 | 0.04 | 0.04 | 0.04 |
| Sodium Carbonate | 0.15 | 0.15 | 0.15 | -------- | 0.15 | 0.15 | 0.15 | 0.15 | 0.15 | 0.15 | 0.15 |
| Benzoyl peroxide | 0.60 | 0.60 | 0.60 | 0.60 | 0.60 | 0.60 | 0.60 | 0.60 | 0.30 | 0.60 | 0.60 |
| Hydrogen peroxide, 30% | 0.03 | 0.03 | 0.03 | 0.03 | -------- | 0.03 | 0.05 | 0.10 | 0.015 | 0.03 | 0.03 |
| Acetaldehyde | 1.7 | 1.7 | 1.7 | 1.7 | 1.7 | 1.7 | 1.7 | 1.7 | 0.42 | ²0.8 | ³0.7 |
| Viscosity, cps., molar benzene solution, at 20° C | -------- | -------- | 7 | 7 | -------- | -------- | 7 | 8 | -------- | 25 | 7 | 7 |
| Viscosity, cps., 60% acetone suspension | -------- | -------- | -------- | -------- | -------- | 8,500 | 9,500 | 11,500 | -------- | -------- | -------- |
| Suspension stability ¹ | Unst. | Unst. | St. | Unst. | Unst. | St. | St. | St. | St. | St. | St. |

¹ St. = stable; Unst. = unstable.
² Propionaldehyde substituted for acetaldehyde.
³ i-Butyraldehyde substituted for acetaldehyde.

Using too little polyvinyl alcohol (Ex. 1 and 2) or omitting the sodium carbonate (Ex. 4) or the hydrogen peroxide (Ex. 5) makes the resulting suspensions unstable. Omitting the organic peroxide, the benzoyl in the table, makes the composition too slow in curing rate to be of interest.

It is noted that the inverse relationship between catalyst concentration and molecular weight normally encountered in polymerizations does not hold for the effect of hydrogen peroxide in the system (see Examples 6, 7 and 8).

It will be understood that it is intended to cover all changes and modifications of the examples of the invention herein chosen for the purpose of illustration which do not constitute departures from the spirit and scope of the invention.

We claim:
1. In the process of polymerizing particles of a vinyl ester of a $C_2$—$C_{18}$ monocarboxylic aliphatic acid suspended as the dispersed phase in water containing polyvinyl alcohol as a dispersant and a water soluble chain transfer agent selected from the group consisting of acetaldehyde propionaldehyde, and butyraldehyde for decreasing the average molecular weight of the resulting polymerized ester, the improvement which comprises introducing into the said suspension a lipophylic organic peroxide as an initiator of polymerization within the suspended particles, hydrogen peroxide as a hydrophylic initiator of polymerization of the exterior surfaces of the said particles, and a water soluble alkali, warming the resulting mixture to cause polymerization at a temperature not above boiling under the prevailing pressure, and adding additional portions of the said alkali in amounts to maintain the pH of the mixture between pH 4.5 and 10 at all times during the polymerization, the proportions used being approximately as follows by weight: 100 parts of the vinyl ester, water 25–1000 parts, organic peroxide 0.02–2 parts, hydrogen peroxide 0.0003–0.3 part on the anhydrous basis, polyvinyl alcohol 0.04%–5% of the weight of the water, and alkali in amount to establish the pH of the aqueous phase initially above 7.

2. The process of claim 1, the said ester being vinyl acetate.

References Cited in the file of this patent
UNITED STATES PATENTS

| | | |
|---|---|---|
| 2,300,566 | Hahn et al. | Nov. 3, 1942 |
| 2,388,602 | Kiar | Nov. 6, 1945 |
| 2,565,783 | Schouteden | Aug. 28, 1951 |
| 2,662,878 | Bryant | Dec. 15, 1953 |

FOREIGN PATENTS

| | | |
|---|---|---|
| 506,989 | Belgium | Nov. 30, 1951 |
| 906,863 | France | May 28, 1945 |